March 3, 1936. F. J. HOYER 2,032,987
AUTOMOBILE RIM
Filed Dec. 26, 1933
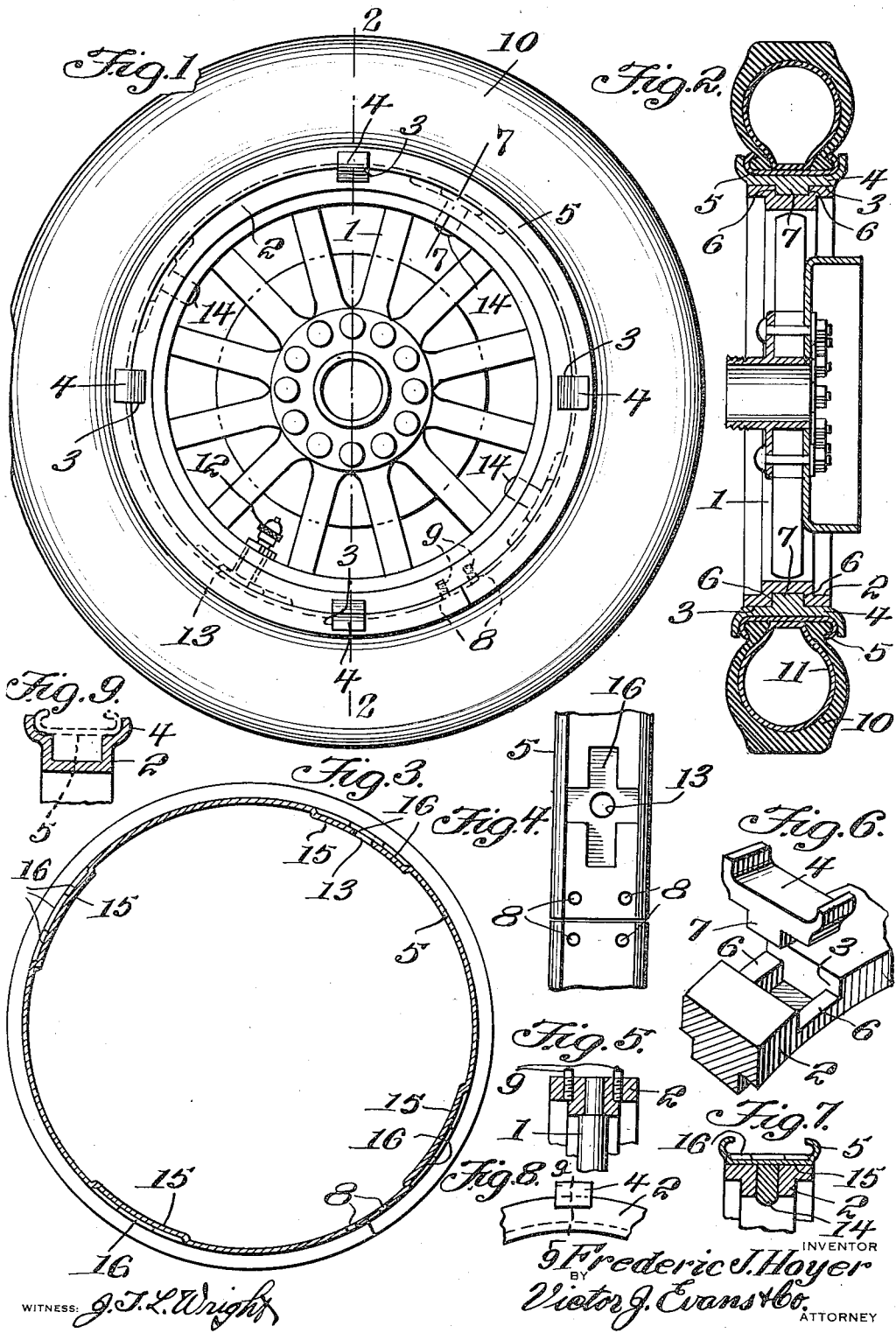
INVENTOR
Frederic J. Hoyer
BY Victor J. Evans & Co.
ATTORNEY
WITNESS: J. T. L. Wright Patented Mar. 3, 1936

2,032,987

UNITED STATES PATENT OFFICE 2,032,987

AUTOMOBILE RIM

Frederic J. Hoyer, Pittsburgh, Pa., assignor of one-third to Fanny E. Frankel and five per cent to Margaret B. Sullivan, Pittsburgh, Pa.

Application December 26, 1933, Serial No. 704,010

1 Claim. (Cl. 152—20)

This invention relates to a tire rim and the mounting thereof to a wheel and has for the primary object the provision of a device of the above stated character which will facilitate mounting and removal of a tire rim to the felly of a wheel and will prevent creeping of the rim relative to the felly when in use and also will materially aid in the mounting of a pneumatic tire to the rim or the removal of said tire therefrom.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a rim mounted to a wheel in accordance with the present invention.

Figure 2 is a sectional view on the line 2—2 of Figure 1.

Figure 3 is a vertical sectional view illustrating the rim.

Figure 4 is a fragmentary plan view illustrating the same.

Figure 5 is a detail sectional view illustrating pins carried by the felly to prevent creeping of the rim.

Figure 6 is a fragmentary perspective view illustrating the means for retaining the rim to the felly.

Figure 7 is a fragmentary transverse sectional view taken on the line 7—7 of Figure 1.

Figure 8 is a fragmentary view illustrating a modified form of my invention.

Figure 9 is a transverse sectional view taken on the line 9—9 of Figure 8.

Referring in detail to the drawing, the numeral 1 indicates a motor vehicle wheel wherein the felly 2 thereof is provided at spaced intervals with cut-away portions or notches 3 for the purpose of receiving cleats or wedges 4 to retain upon the felly a rim 5. The recesses or cutaway portions 3 are so shaped as to provide oppositely arranged shoulders 6 between which are received lugs 7 integral with the cleats 4 to prevent transverse movement of the cleats with respect to the felly. The rim 5 is of the split type, as shown in Figure 4, and is constructed of resilient material and located adjacent its detached ends are openings 8 which receive pins 9 carried by the felly when the rim is mounted on said felly for the purpose of preventing the rim from creeping relative to the felly during the use of the device. To apply the rim 5 to the felly the rim is expanded so as to move over the flanges of the cleats 4. The rim 5 fits between the flanges of the cleats and is thereby retained upon the felly when the tire carried by the rim is under inflation. The tire, as shown at 10, is of the pneumatic type having an inner tube 11, the valve 12 thereof extending through an opening 13 in the rim and also into one of a series of openings formed in the felly, the other openings of the felly being employed to receive weights 14 for the purpose of balancing the wheel.

The rim 5 is provided with spaced offset portions 15 which form in the outer face of said rim channels or grooves 16 in which portions of the inner tube may rest and when the inner tube is inflated, said portions thereof contacting with the walls of the grooves aid in preventing creeping of the inner tube within a tire. One of the offsets 15 is located at the opening 13 which receives the valve stem of the inner tube.

The cleats 4 may be cast or formed integral with a felly when the latter is made of metal as suggested in Figures 8 and 9 of the drawing.

Having described the invention, I claim:

A wheel construction comprising a felly having cutout portions each defining pairs of opposed shoulders with a recess therebetween, cleats each resting on a pair of shoulders of the cutout portions and abutting the other pair of shoulders of said cutout portions to prevent movement of the cleats circumferentially of the felly, projections formed on the cleats and extending into the recesses to prevent said cleats from moving laterally of the felly in either direction, a split rim mounted on said cleats and having openings, and pins secured to the felly and projecting into the openings to prevent the rim creeping circumferentially of the felly on the cleats, and said cleats having their outer body portions conforming in cross section to that of the rim and providing a continuation of said rim.

FREDERIC J. HOYER.